United States Patent
Dan-Jumbo (10) Patent No.: US 9,434,139 B2
(45) Date of Patent: Sep. 6, 2016

(54) STRUCTURAL INTEGRATED REPAIR METHOD AND SYSTEM TOOL DEVICE FOR REPAIRING DELAMINATED COMPOSITE STRUCTURES

(71) Applicant: The Boeing Company, Chicago, IL (US)

(72) Inventor: Eugene Dan-Jumbo, Bothell, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 14/267,052

(22) Filed: May 1, 2014

(65) Prior Publication Data

US 2015/0314577 A1 Nov. 5, 2015

(51) Int. Cl.
| | | |
|---|---|---|
| B29C 73/00 | (2006.01) | |
| B32B 43/00 | (2006.01) | |
| B29C 65/00 | (2006.01) | |
| B32B 37/00 | (2006.01) | |
| B32B 38/10 | (2006.01) | |
| B29C 70/54 | (2006.01) | |
| B29C 73/02 | (2006.01) | |
| B29C 73/14 | (2006.01) | |
| B29C 70/44 | (2006.01) | |
| B29C 65/48 | (2006.01) | |
| B29C 65/54 | (2006.01) | |
| B29C 73/30 | (2006.01) | |

(52) U.S. Cl.
CPC ......... *B32B 37/0023* (2013.01); *B29C 70/443* (2013.01); *B29C 70/545* (2013.01); *B29C 70/546* (2013.01); *B29C 73/025* (2013.01); *B29C 73/14* (2013.01); *B29C 65/48* (2013.01); *B29C 65/542* (2013.01); *B29C 65/544* (2013.01); *B29C 66/71* (2013.01); *B29C 73/30* (2013.01)

(58) Field of Classification Search
CPC ... B29C 63/00; B29C 63/0004; B29C 65/00; B29C 65/48; B29C 65/4805; B29C 65/483; B29C 65/52; B29C 65/54; B29C 65/542; B29C 65/544; B29C 66/00; B29C 66/70; B29C 66/71; B29C 73/00; B29C 73/02; B29C 73/025; B32B 43/00
USPC ............. 156/60, 91, 92, 94, 95, 97, 98, 153, 156/154, 247, 250, 285, 286, 293, 294, 295, 156/303.1
See application file for complete search history.

(56) References Cited

U.S. PATENT DOCUMENTS

| | | | |
|---|---|---|---|
| 2,585,635 A * | 2/1952 | Dibble | .................... B29C 73/06 152/367 |
| 6,385,836 B1 | 5/2002 | Coltrin | |
| 2004/0003889 A1* | 1/2004 | Stadtlander | ........... B29C 65/544 156/285 |
| 2011/0139769 A1 | 6/2011 | Miller | |
| 2014/0034217 A1* | 2/2014 | Woodruff | ................ B29C 73/06 156/94 |

FOREIGN PATENT DOCUMENTS

| | | |
|---|---|---|
| DE | 3909560 A1 | 9/1990 |
| FR | 2985680 A1 | 7/2013 |

* cited by examiner

*Primary Examiner* — Philip Tucker
*Assistant Examiner* — Brian R Slawski
(74) *Attorney, Agent, or Firm* — Felix L. Fischer (57) ABSTRACT

A system for repair of damaged holes in composite structures incorporates a repair system tool device having a sleeve sized to be closely received in a hole in a composite structure. The sleeve has a central bore for receiving parent resin and an array of orifices for radial expulsion of the parent resin into the hole. A caul plate seals the central bore and a vacuum bag covering the caul plate is sealed to the surface of the composite structure. Introduction of vacuum in the vacuum bag provides a differential pressure for infusion of resin from the orifices in the sleeve into delaminations extending from the hole.

20 Claims, 14 Drawing Sheets

STRUCTURAL INTEGRATED REPAIR METHOD AND SYSTEM TOOL DEVICE FOR REPAIRING DELAMINATED COMPOSITE STRUCTURES

BACKGROUND INFORMATION

1. Field

Embodiments of the disclosure relate generally to structural repair of cracks or delamination surrounding holes in a composite structure and more particularly to an apparatus and method for injection of parent resin into such cracks or delamination employing a system tool device with a perforated sleeve having orifices for resin flow laterally between sealing end flanges.

2. Background

Fabrication of large structures employing composite materials is rapidly replacing metal fabrication in many applications including the structures for aircraft, automotive, marine and space vehicles. Drilling of holes in composites is challenging due to the nature of the materials and damage may be introduced in composite material adjacent the hole during the drilling process including cracking or delamination. Such defects, if not captured during the composite non-destructive inspection process, may serve as potential failure initiation sites or provide the potential for moisture ingression from delamination which is detrimental to the long-term durability, life and damage tolerance capability of the composite structure. Additionally, the defects or delamination damage may reduce structural integrity of the fastener system employed in the hole or the joint created. Current repair techniques require removal of a large amount of composite materials adjacent the hole to eliminate any cracks or delaminations and replacement of the composite structure with a scarfed patch or similar repair technique. Such repairs are costly and time consuming It is therefore desirable to provide a method and appropriate system tooling device for direct repair of delamination damage to a composite structure adjacent a hole or holes .

SUMMARY

Exemplary embodiments provide a system for repair of damaged holes in composite structures incorporating a repair tool having a sleeve sized to be closely received in a hole in a composite structure. The sleeve has a central bore for receiving parent resin and an array of orifices for radial expulsion of the parent resin into adjacent delaminations in the hole. A caul plate seals the central bore and a vacuum bag covering the caul plate is sealed to the surface of the composite structure. Introduction of vacuum in the vacuum bag provides a differential pressure for infusion of resin from the orifices in the sleeve into delaminations extending from the hole.

The embodiments herein provide a method for repair of damage holes in composite structures in which a non-destructive evaluation of the structural composite delaminated hole is conducted to assess damage. A repair tool sleeve having a plurality of orifices is then inserted into the damaged delaminated hole. A predetermined amount of parent toughed resin is introduced into the sleeve of the repair tool through a central bore in the sleeve. A caul plate is installed and bagged for application of vacuum. Vacuum is applied on the bag to urge the caul plate into sealing contact with the top flange maintaining substantially atmospheric pressure in the sleeve while placing a laminate around the hole under vacuum for diffusion of the resin through orifices in the sleeve. The resin is forced into the delamination region in the laminate within the hole by capillary action.

BRIEF DESCRIPTION OF THE DRAWINGS

The features, functions, and advantages that have been discussed can be achieved independently in various embodiments of the present disclosure or may be combined in yet other embodiments further details of which can be seen with reference to the following description and drawings.

FIG. 7 is a section view of the repair tool with a caul plate and vacuum bag installed for resign diffusion and curing;

DETAILED DESCRIPTION

The embodiments described herein provide an integrated manufacturing repair method/process with a repair system tool device to accomplish the repair of complex composite holes with multiple delaminations, matrix cracks or disbonds (generally referred to herein as delaminations) generated in a structural composite fastener damaged hole as a result of improper drilling of holes with a dull drill or with the wrong cutting speed, or inaccurately drilled holes with the wrong drill edge margin within the factory fast manufacturing environment. This integrated resin infusion repair method employs a repair system tool device with an elongated open titanium sleeve having flanges at each end with multiple infusion orifices or tubes extending through the sleeve for a lateral resin flow into the delaminated or otherwise damaged hole surfaces under differential pressure of approximately 1 atmosphere induced by vacuum bagging the composite structure adjacent to the hole being repaired.

The repair system tool device is employed by first installing the infusion/injection sleeve in a clearance hole with damage delaminated surfaces. Resin is introduced into the sleeve which is then sealed with a caul plate and bagged. Vacuum is applied to the bag which, through inducing a differential pressure in the laminate, causes the resin to be infused into the damaged areas through the orifices or tubes through the sleeve side wall. The integrated in-factory resin infusion method using the associated repair system tool device restores structures local static strength, damage tolerance, and fatigue durability up to 150% of limit load with no defect for rejection.

Figure 1A:
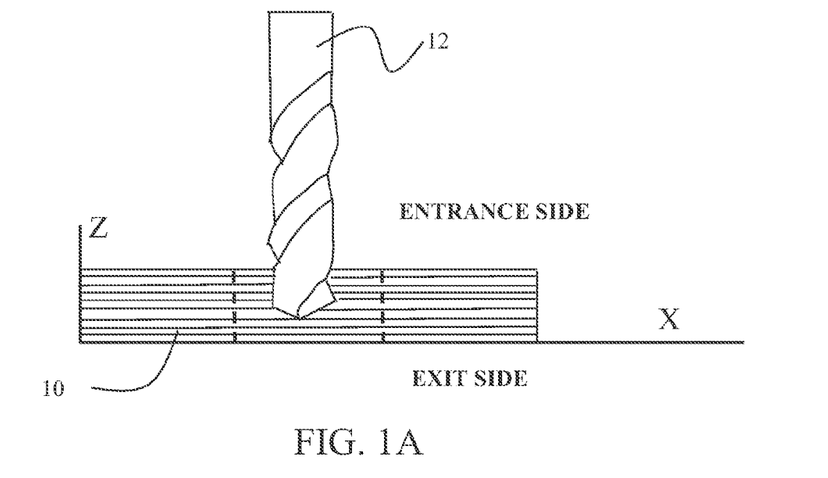
FIG. 1A is a pictorial representation of drilling operations on a composite structure.
Figure 1B:
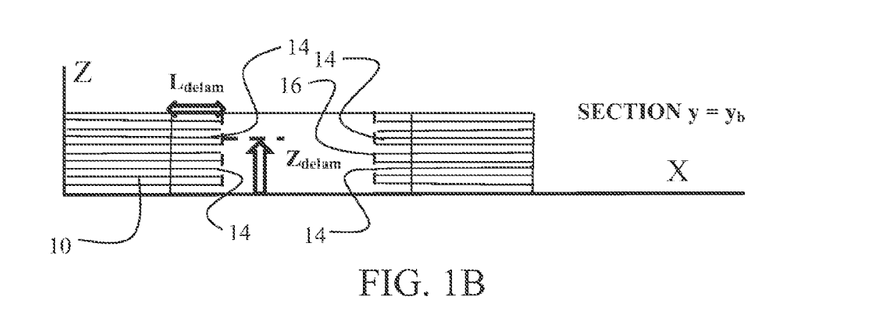
FIG. 1B is a section view of a hole area in a composite in which cracking or delamination has occurred from the drilling operation of FIG. 1A.
Figure 2:
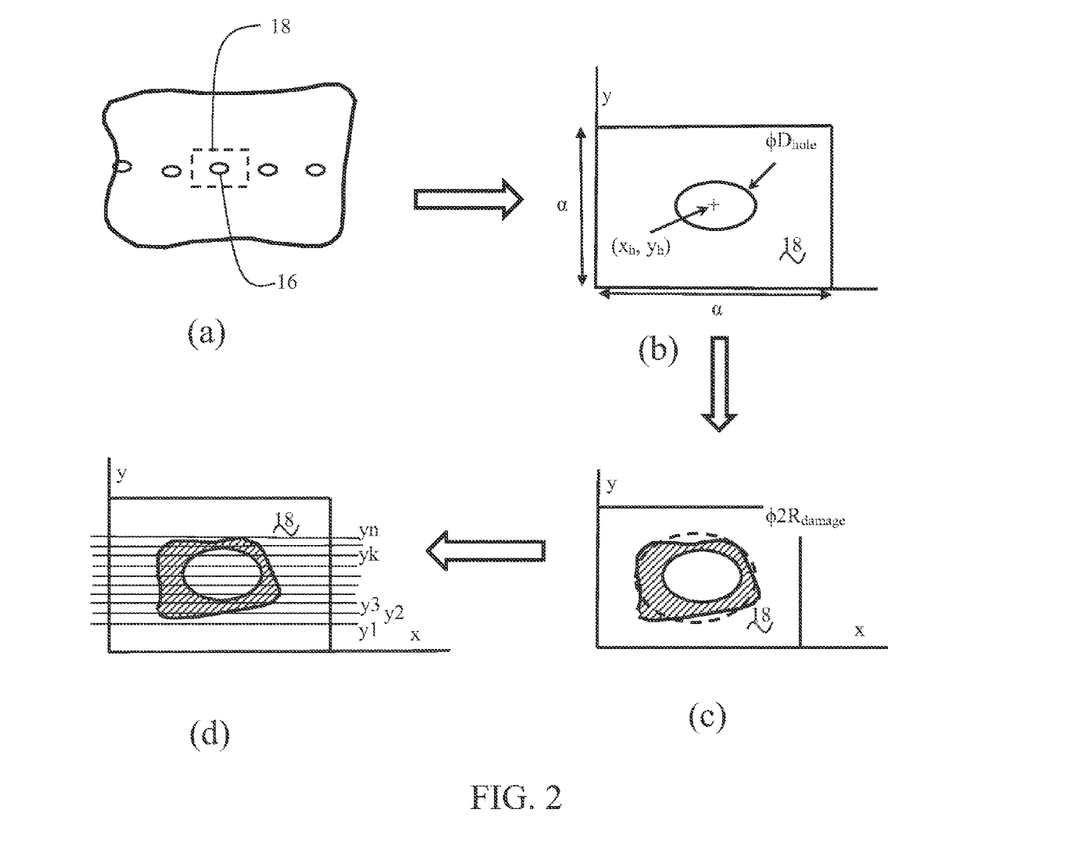
FIG. 2 is a flow chart demonstrating characterization of damage within a hole.

Referring to the drawings, FIG. 1A provides a representation of a drilling operation on a composite structure 10 using a drill bit 12. If the bit 12 is insufficiently sharp or the feeds/speeds of the drilling operation are incorrect, defects such as cracking or delaminations 14 in the composite structure may occur extending from the surface of the hole 16 as represented in FIG. 1B for a section in the y axis defined as $y=y_b$ for the example in the figure and wherein $z_{delam}$ represents the vertical dimension of the defect within the thickness of the laminate structure 10 and $L_{delam}$ represents the length or depth of the defect extending into the laminate structure 10. When such defects are identified, characterization of the nature and region of the defect(s) is accomplished as represented in the flow sequence shown in FIG. 2. A region 18 around a damaged hole 16 is identified as shown in step (a) and the region geometry is dimensionally characterized with the coordinate system in planes for the lateral axes x, y and vertical axis z with a template for non-destructive inspection (NDI) as shown in step (b). NDI such as true transmission ultrasonic (TTU) is employed on the damaged hole for confirmation of location, extent and depth of the damage as represented in step (c). The extent of the delaminated layers (plies) as shown in the shaded area is sectioned for lateral extent, y, as show in step (d) with various sections $y=y_b$ shown from b=1 to n, and vertical position, z, (as shown in FIG. 1B) for calibration of a predetermined lateral resin infusion.

Figure 3:
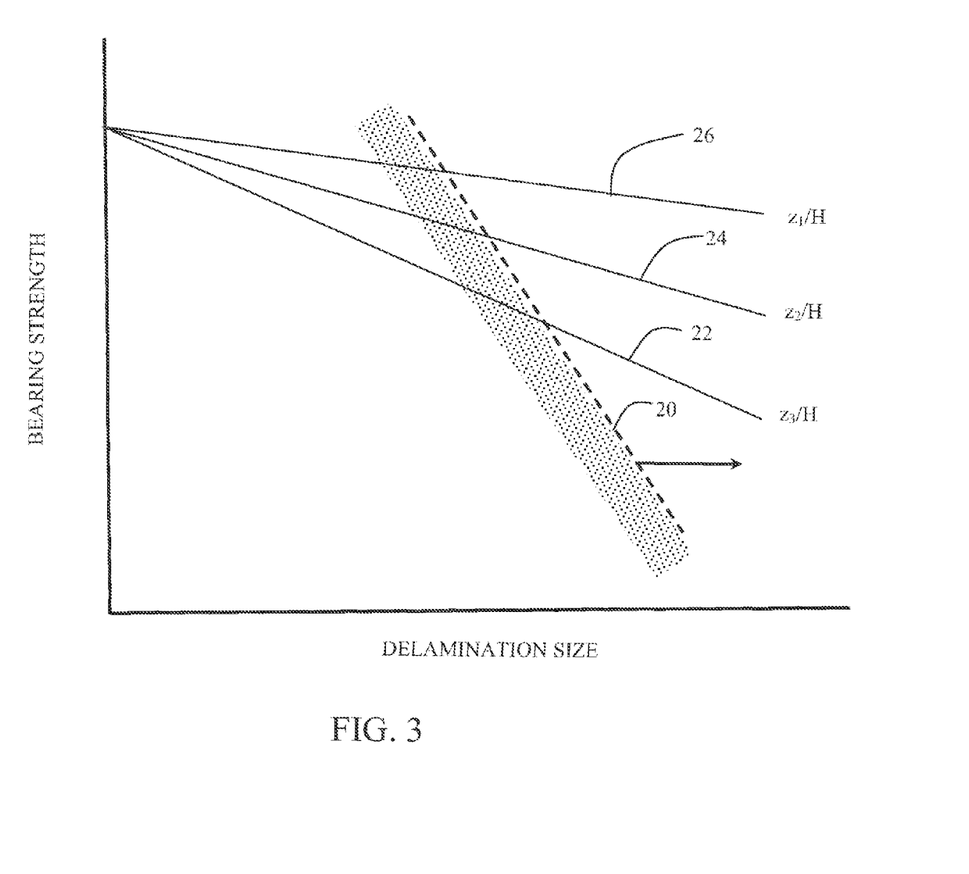
FIG. 3 is a graph showing bearing strength degradation resulting from delamination size with exemplary profiles for efficacy of repair.

Structurally, the degradation of composite laminate strength under bypass loading must be accounted for in the presence of drilling operations induced hole damage with multiple delaminations since it diminishes structural strength by 50% if the damages are not repaired effectively. The notched (delaminated damage) strength of structural laminates is typically calculated using a characteristic length which captures the load redistribution in the region of the stress concentrations. The presence of delaminations, matrix cracks, dis-bonds, or similar defects will alter the load redistribution as well as the free-edge stresses of the structure, and, as a result, reduce the structural strength. Thus, the characteristic lengths established for holes without delaminations (damages) will not be used for the damaged hole(s) without characterizing the damage. By introducing a parent resin (the same resin or an equivalent to the original resin in the laminate structure) infused into the delaminated plies and thus repairing the damaged composite structure, the very expensive scarf patch and the associated time consuming repair process may be eliminated. The effect of the delaminated size and its location across the laminate thickness on the characteristic lengths was established as shown notionally in FIG. 3 for bearing strength vs. delamination size with designation of a boundary 20 beyond which sublaminate buckling leading to delamination propagation will occur. A first strength degradation curve $z_3/H$, 22, demonstrates relative bearing strength for delamination damage without resin repair. Strength degradation curve $z_2/H$, 24, demonstrates strength for improved infused resin repair in shallow damage, while strength degradation curve $z_1/H$, 26, demonstrates strength for improved infused resin repair value with deep damage.

Figure 4:
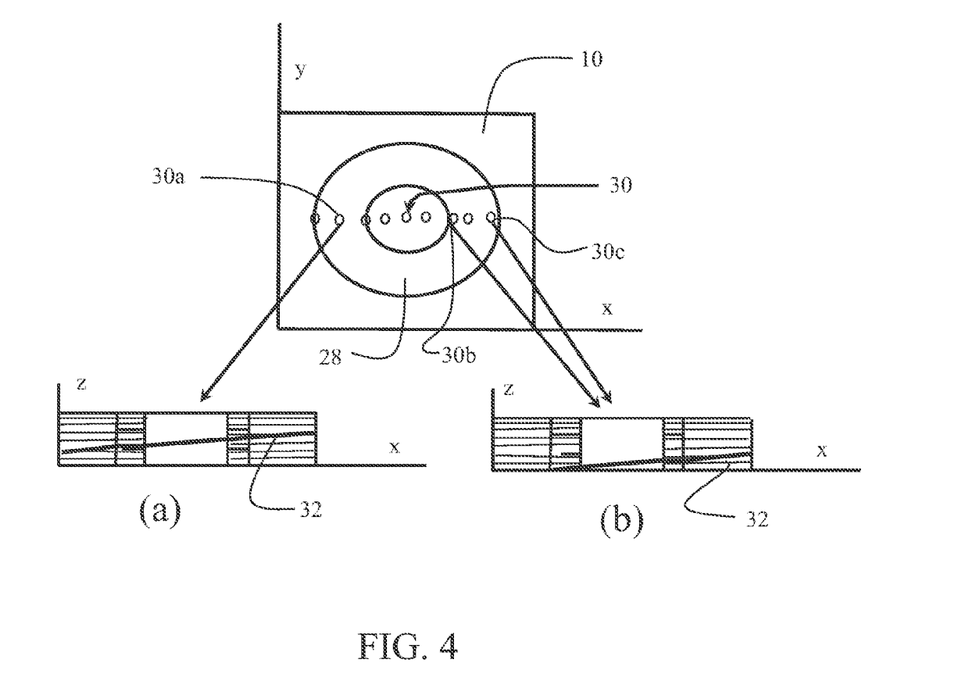
FIG. 4 is a representation of exemplary holes in a region associated with a prior scarf repair which may incur damage.

As previously noted, the present embodiments and method may also be employed for holes in regions where preexisting scarf patch repairs have been made. as shown in FIG. 4. As previously described, a scarf patch repair is accomplished by removing a relatively large amount of laminate around a defect (a scarf) and then filling the scarf with a laminate patch. A composite structure 10 may have a scarf region 28 from a prior repair shown relative to the x,y coordinates associated with the structure 10. Multiple holes 30 may be present penetrating through the bond line 32 of the patch in the scarf. The bond line 32 varies in depth (the z dimension) based on the depth of the scarf and may extend through the central portion of the composite laminate in structure 10 for certain holes 30a as shown in section (a) or through peripheral layers in the composite laminate for other holes 30b, 30c as shown in section (b). The embodiments and processes described herein are applicable to damaged holes independent of the scarf bond line depth and may be employed in the initial manufacturing process or for damaged holes created or identified during field maintenance or repair.

Figure 5A:
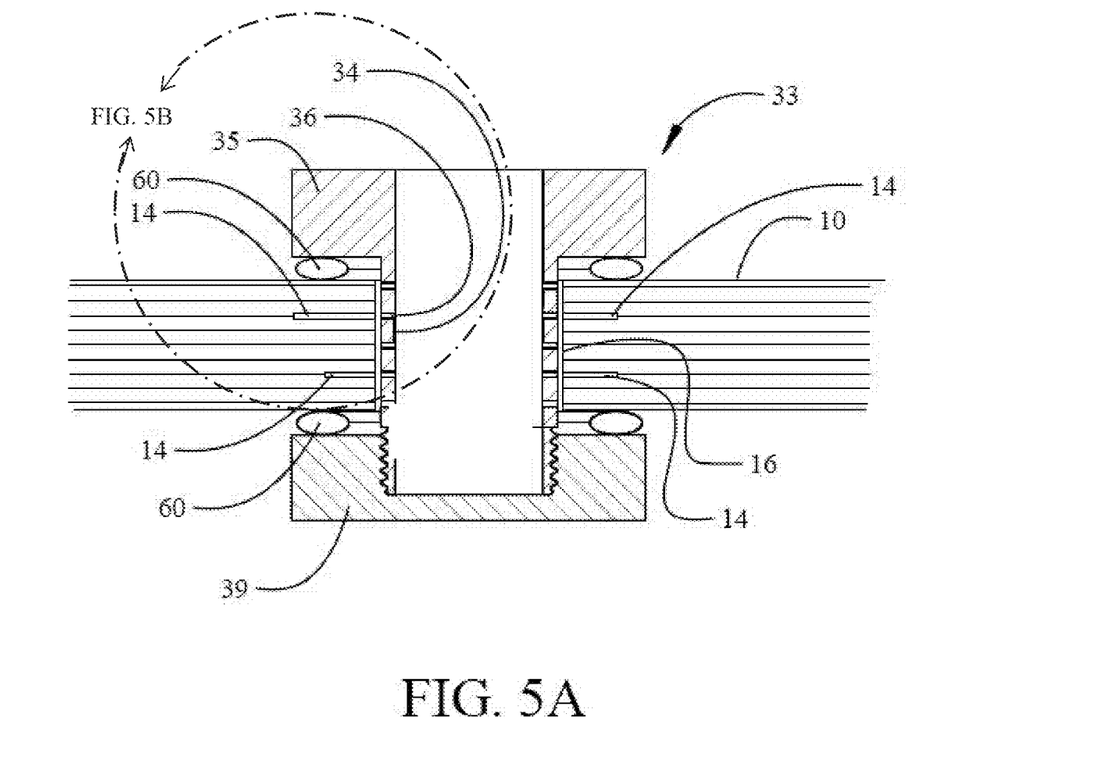
FIG. 5A is a side section view of a basic embodiment of the repair system tool device as inserted into a hole in a composite structure for the repair process.
Figure 5B:
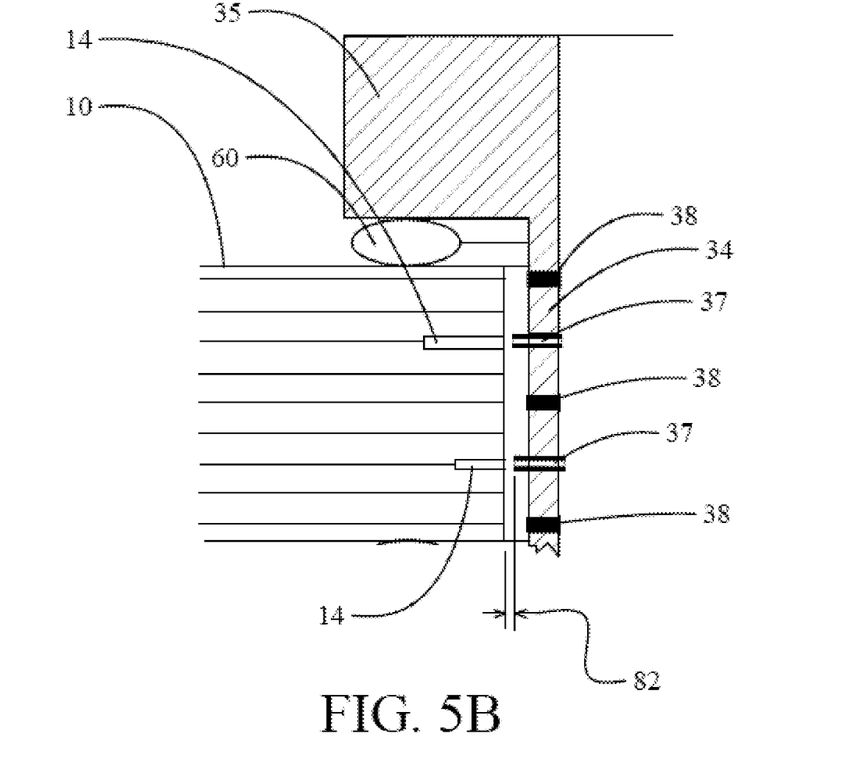
FIG. 5B is an enlarged detail partial section view of the basic embodiment of FIG. 5A.

FIGS. 5A and 5B show a basic structure for a repair system tool device 33. The system tool device 33 includes a sleeve 34 incorporating orifices 36. The sleeve 34 extends from a top flange 35 which contacts the structure 10 around the hole 16. Tubes 37 may be inserted through orifices identified for introduction of resin into delaminations determined by the NDI. The tubes 37 may extend beyond the outer surface of the sleeve 34 to provide a minimum clearance 82 from the inner surface of hole 16 without requiring the entire sleeve to have a diameter providing the minimum clearance as shown in detail in FIG. 5B. In exemplary embodiments, clearance for the tube 37 from the surface of a 0.25 inch diameter hole would be approximately 0.006 inch or less, as seen in FIGS. 5A and 5B. Vertical spacing of the orifices 36 in an array allows multiple delaminations 14 or other defects spaced in the z direction as shown in FIG. 1B to be repaired in a single infusion of resin through orifices adjacent each delamination. Rotation of the system tool device 33 may be accomplished for orientation of the orifices with the x and y positions of the delaminations or defects as determined by the NDI. Orifices in the system tool device that are not required for a particular repair may be sealed with plugs 38. A threaded bottom flange 39 is employed to engage the system tool device 33 to the composite structure 10 and o-rings 60 may be employed for sealing the top flange 35 and bottom flange 39 to the structure 10 as will be described in greater detail with respect to a generalized embodiment.

Figure 6:
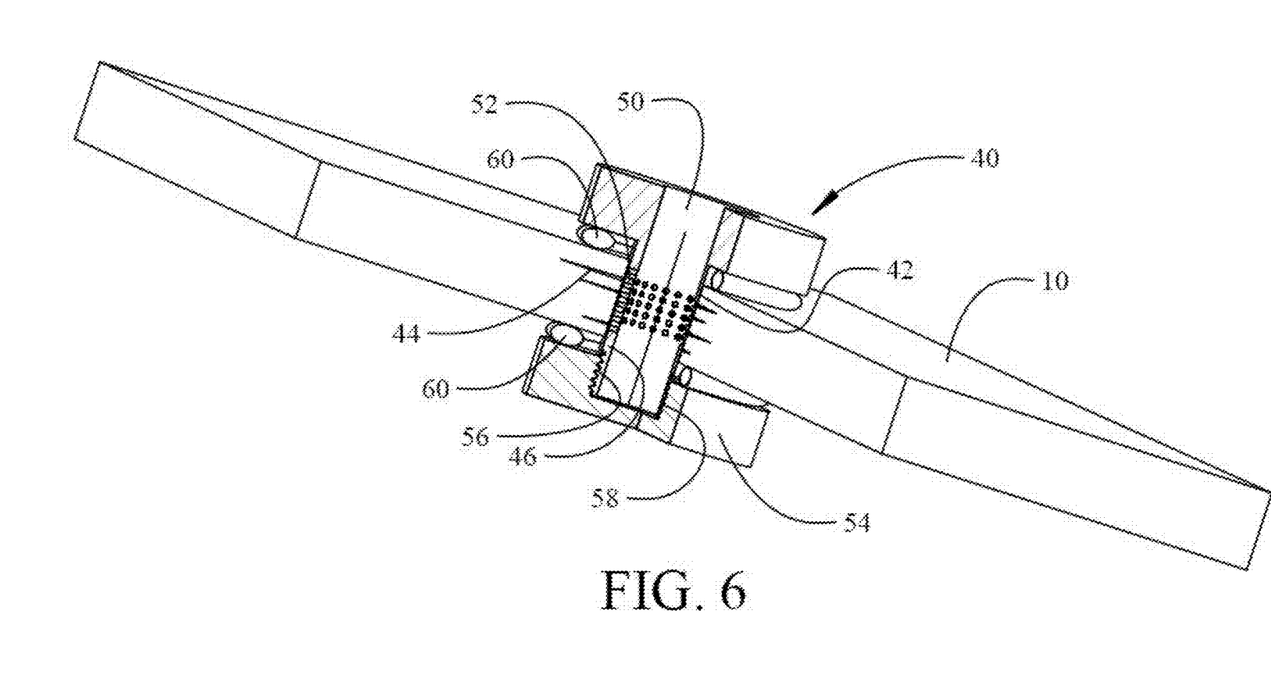
FIG. 6 is a partial section view of a generalized embodiment of the repair system tool device as inserted into a hole in a composite structure for the repair process.
Figure 7:
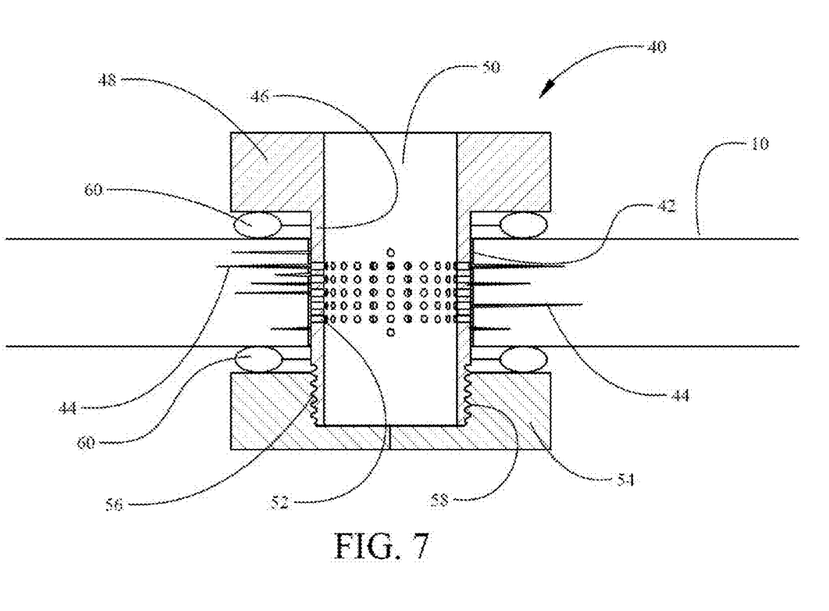
FIG. 7 is a detailed section view of the embodiment of the repair tool shown in FIG. 6.

FIGS. 6 and 7 show a generalized embodiment of a repair system tool device 40 positioned for conducting a repair in a hole 42 in a composite structure 10 (individual layers or laminations of the structure 10 are not shown for clarity of other details). A number of delaminations or cracks 44 extend into the structure from the surface of the hole 42. As with the basic embodiment system tool device 40 incorporates a sleeve 46 extending from an upper flange 48. For exemplary embodiments, the sleeve and upper flange are titanium. The sleeve is sized to be closely received within the hole 42 and extend through the hole between the surfaces of the composite structure 10. A central bore 50 is present in the upper flange 48 and sleeve 46. An array of orifices which may be tubes or perforations 52 extend radially through the sleeve 46 from the bore 50. As described previously with respect to the basic embodiment, the perforations 52 may be individually plugged to leave an array matching the location of defects determined by the NDI examination into which resin will be introduced during the repair process. As will be described in detail subsequently, resin is introduced into the bore 50 for expulsion through the perforations 52 to be infused into the damaged laminate surrounding the hole 42. The perforations 52 may be in a generalized geometric array or may be arranged in a predetermined pattern to achieve maximized introduction of resin adjacent the cracks or delaminations 44. Size of the perforations will be determined based on viscosity of the parent resin being introduced and the perforations may be of any required diameter. In exemplary embodiments a diameter of 0.01 to 0.1 inch is employed. For the embodiment shown, a closed lower flange 54 is employed to seal the sleeve 46. Coupling of the lower flange 54 to the seal maybe accomplished by a threads 56 on the sleeve 46 received within a mating threaded bore 58 in the lower flange. Resilient O-rings 60 are engaged between the upper flange and lower flange and the top and bottom surfaces of the composite structure 10 to seal the system tool device 40 to the structure. A cetyle alcohol lubricant or similar coating may be applied to the sleeve to assist in insertion of the sleeve into the hole and reduce adherence of the resin to the sleeve.

Figure 8:
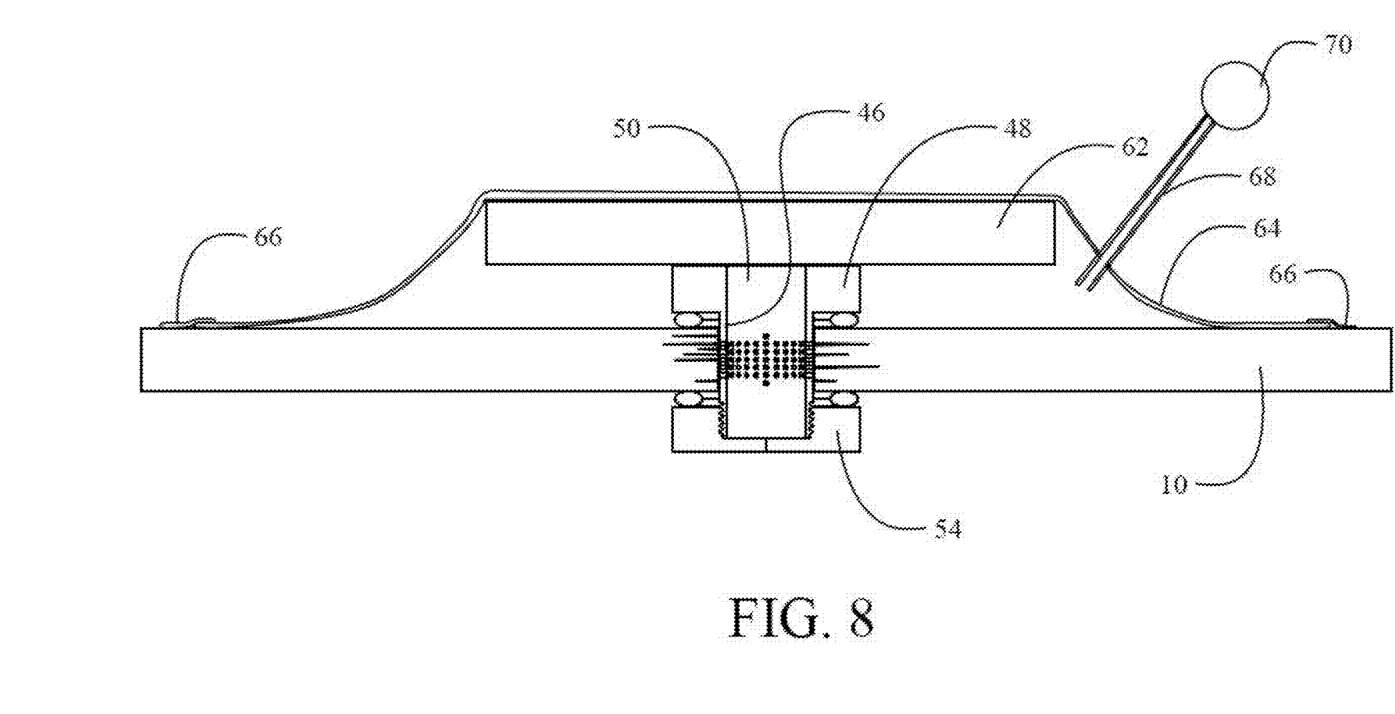

Parent resin is introduced into the bore 50 using a syringe or appropriate fitting to fill the sleeve 46 with an appropriate quantity of resin. As shown in FIG. 8, a caul plate 62 is then place over the upper flange 48 sealing the bore 50. A standard vacuum bag 64 is then draped over the caul plate 62 and sealed at the edges with tapes 66 to the surface of the composite structure 10. A standard vacuum fitting 68 connected to a vacuum source 70 may be employed to draw vacuum on the bag 64. Introduction of vacuum on the bag 64 seals the caul plate 62 against the upper flange 48 and provides a pressure differential between the resin filed sleeve 46 and the composite laminate of the structure 10 thereby inducing diffusion of the resin from the sleeve, through perforations 52 and into the cracks or delaminations 44. Size of the cracks or delaminations typically induces capillary action for entrainment of the resin. In exemplary embodiments a vacuum resin cure of 2 hours is employed.

Figure 9:
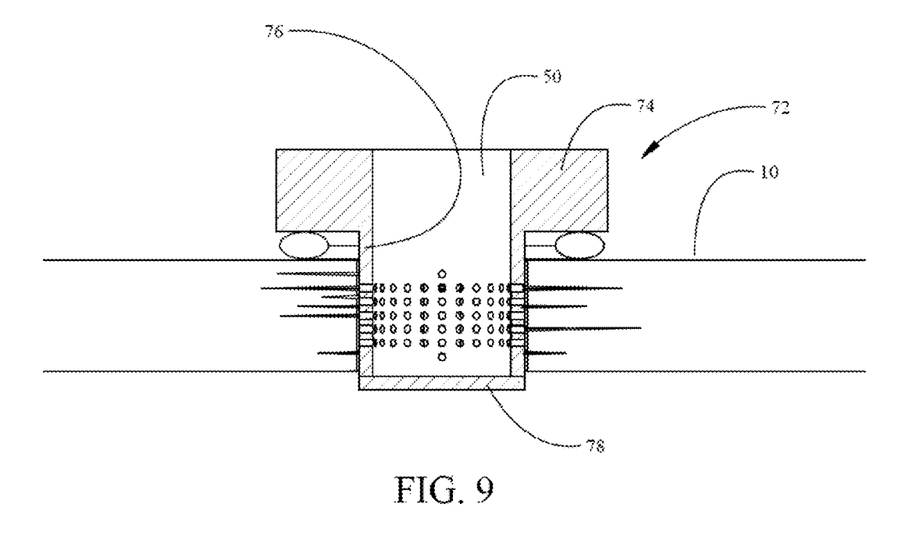
FIG. 9 is a detailed section view of a second embodiment of the repair tool for applications in which access to both sides of the composite structure are not available.

An alternative embodiment for the repair system tool device 72 is shown in FIG. 9 for applications where no access to one side of the structure 10 may be present. Repair system tool device 72 employs an upper flange 74 with extending sleeve 76 as in the prior embodiment. However, the sleeve 76 is sealed with an end plate 78 at an end opposite the upper flange 74 to preclude the necessity of a lower flange to seal the sleeve. An O-ring 60 between the upper flange 74 and surface of the structure 10 is still employed and upon capping of the upper flange and bore 50 with a caul plate as previously described, and drawing vacuum with a sealed bag, the upper flange 74 will compress the o-ring 60 to achieve a seal.

Figure 10:
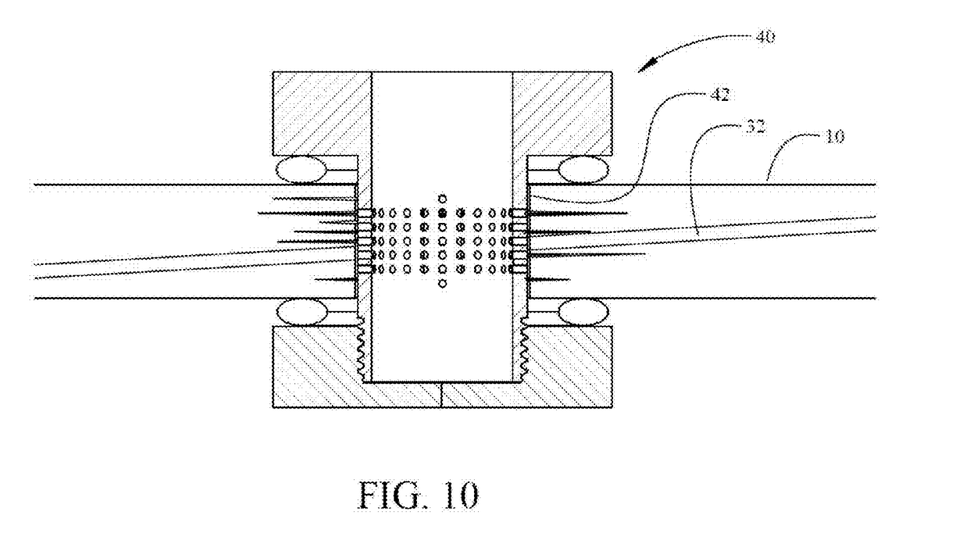
FIG. 10 is a detailed section view of application of the tool in a scarfed region.
Figure 11:
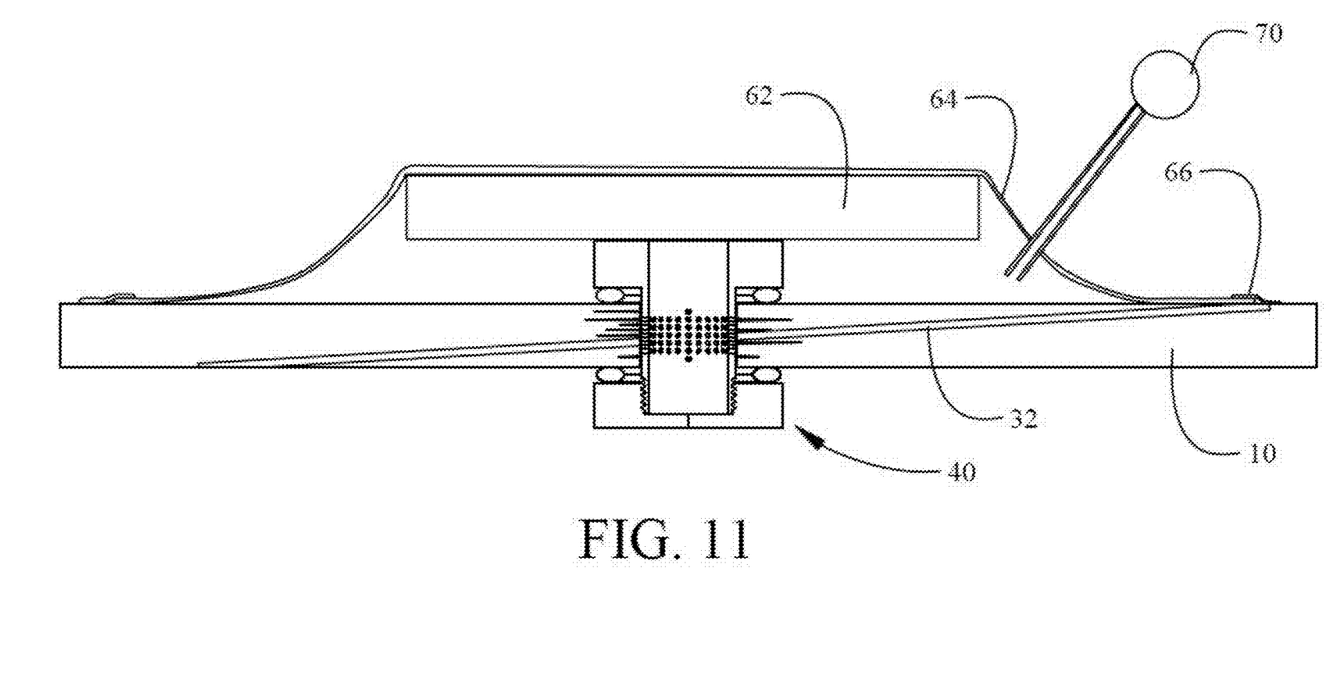
FIG. 11 is a section view of the repair tool in the scarfed region with a caul plate and vacuum bag installed for resign diffusion and curing.

FIGS. 10 and 11 demonstrate in detail use of the repair system tool device 40 with a hole 42 in a scarf repair region wherein the scarf bond line 32 transitions through the laminate of the structure 10. As shown in FIG. 11, the vacuum bag 64 may be sized to extend over the scarf repair region.

Figure 12:
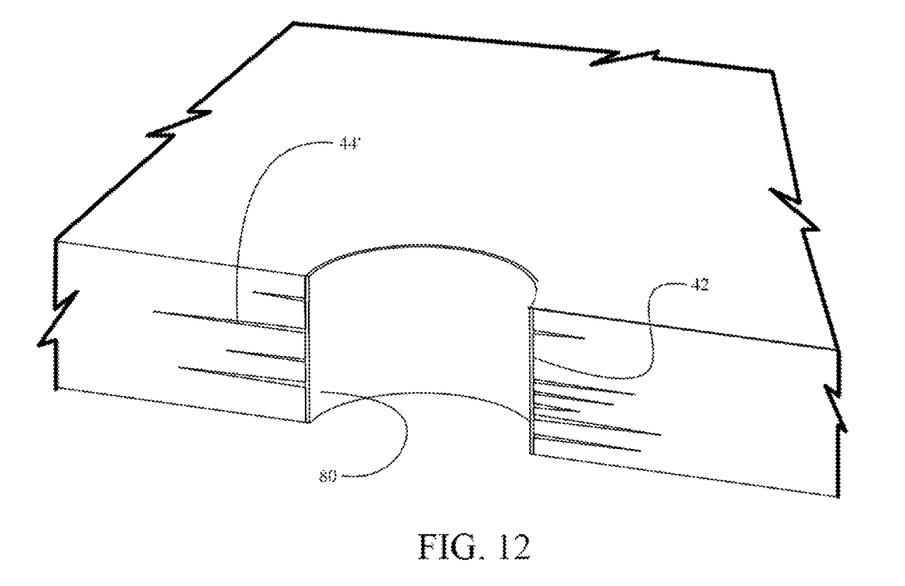
FIG. 12 is a perspective section view of a repaired hole in the composite structure; and, FIGS. 13A and 13B are a flowchart demonstrating the operation of the embodiments disclosed herein.

With each of the described embodiments, upon completion of the cure period, the vacuum is released, the bag and caul plate removed and the repair system tool device 40, 72 is removed from the structure extracting the sleeve from the hole 42. As shown in FIG. 12, the repaired area around hole 42 will include cracks or delaminations 44' with parent resin fill and a resin skin or barrel 80 present in the gap between the sleeve and hole. Refinishing of the hole 42 may be accomplished by reaming the resin barrel 80 to the desired hole diameter. Reaming limited to the thickness of the resin barrel 80 prevents any additional damage to the composite laminate adjacent the surface of the hole.

Figure 13A:
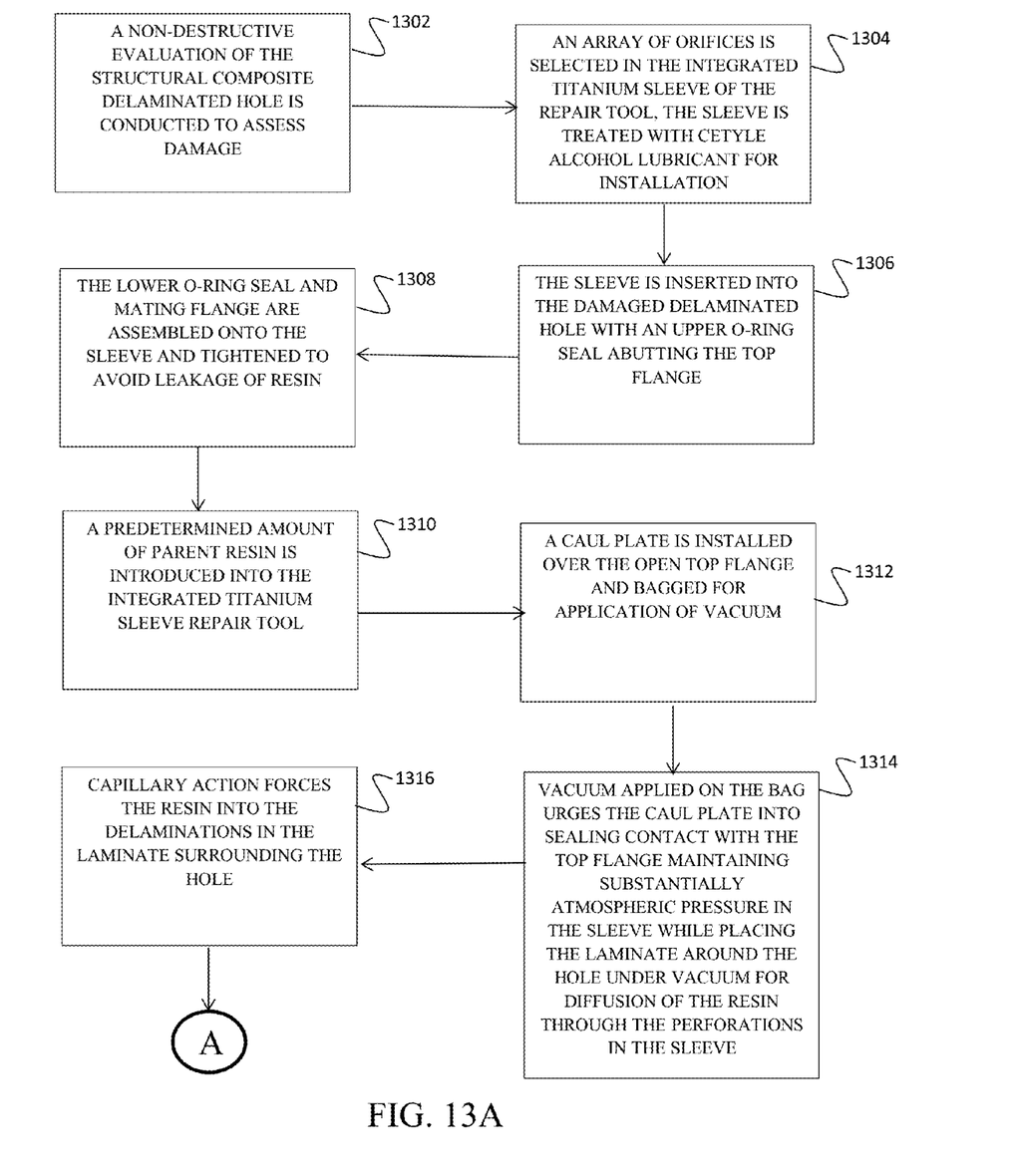
Figure 13B:
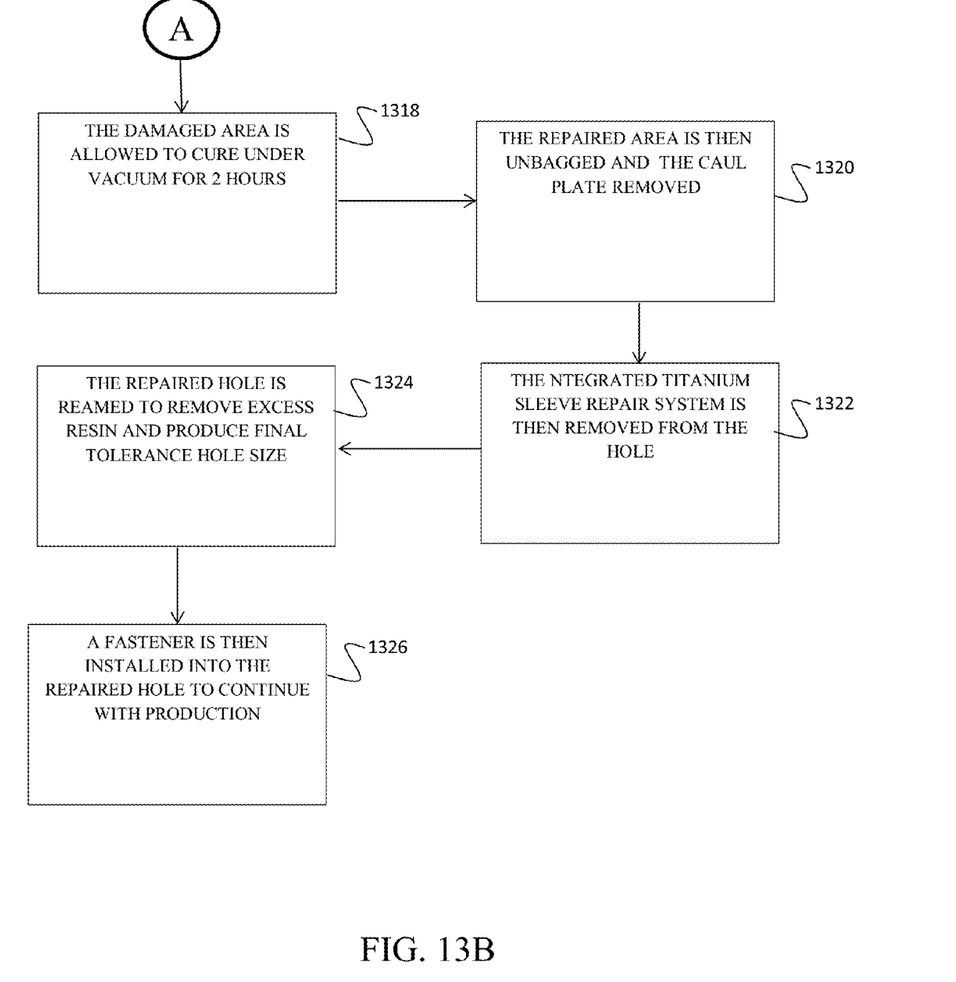

The method for repair of a damage hole in a composite structure using the embodiments of the repair system tool device described herein is shown in FIGS. 13A and 13B. For a damaged hole, a non-destructive evaluation of the structural composite delaminated hole is conducted to assess damage, step 1302. Based on the non-destructive evaluation, an array of orifices in a titanium sleeve or a repair system tool device is selected for alignment with delaminations in the hole, orifices in the sleeve not included in the selected array may be plugged and the integrated titanium sleeve of the repair system tool device is treated with cetyle alcohol lubricant for installation, step 1304. The sleeve is inserted into the damaged delaminated hole with an upper o-ring seal encircling the sleeve and abutting the top flange, step 1306. The lower o-ring seal and mating flange are assembled onto the sleeve and tightened to avoid leakage of resin, step 1308. In embodiments where no access is available to the second side of the composite structure a sealed sleeve is employed. A predetermined amount of parent resin is introduced into the integrated titanium sleeve repair system tool device through the central bore in the upper flange and sleeve, step 1310. A caul plate is installed over the open top flange and bagged for application of vacuum, step 1312, and vacuum applied on the bag urges the caul plate into sealing contact with the top flange maintaining substantially atmospheric pressure in the sleeve while placing the laminate around the hole under vacuum for diffusion of the resin through the perforations in the sleeve, step 1314. Capillary action forces the resin into the delaminations in the laminate surrounding the hole, step 1316. The damaged area is allowed to cure under vacuum for 2 hours, step 1318, after which the repaired area is then unbagged, the caul plate removed, step 1320 and the repair system tool device sleeve may then be withdrawn from the hole, step 1322. The repaired hole is reamed to remove excess resin and produce final tolerance hole size, step 1324. A fastener is then installed into the repaired hole to continue with production, step 1326. The defined repair process provides significant advantages over prior art scarfed repairs by reducing overall structural weight thereby allowing operational savings based on reductions in fuel usage.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A system for repair of damaged holes in composite structures, said system comprising:
   a repair system tool device having a sleeve sized to be closely received in a hole in a composite structure, said sleeve having a central bore for receiving parent resin and a selected array of orifices for radial expulsion of the parent resin into adjacent delaminations in the hole;
   a caul plate sealing the central bore;
   a vacuum bag covering the caul plate and sealed to a surface of the composite structure, wherein introduction of vacuum in the vacuum bag provides a differential pressure for infusion of resin from the orifices in the sleeve into delaminations extending from the hole.

2. The system for repair of damaged holes in composite structures as defined in claim 1 wherein the repair system tool device further comprises an upper flange from which the sleeve extends.

3. The system for repair of damaged holes in composite structures as defined in claim 2 further comprising a seal received around the sleeve adjacent the upper flange, said seal engaging a top surface of the structure around the hole.

4. The system for repair of damaged holes in composite structures as defined in claim 3 wherein the central bore of the sleeve is sealed opposite the upper flange.

5. The system for repair of damaged holes in composite structures as defined in claim 3 further comprising a lower flange engaging the sleeve opposite the upper flange and a seal received around the sleeve adjacent the lower flange, said seal engaging a bottom surface of the structure around the hole.

6. The system for repair of damaged holes in composite structures as defined in claim 5 wherein the sleeve incorporates a threaded end received in a mating threaded bore in the lower flange.

7. The system for repair of damaged holes in composite structures as defined in claim 1 wherein each of the orifices in the array of orifices has a diameter of between 0.01 and 0.1 inch.

8. The system for repair of damaged holes in composite structures as defined in claim 1 wherein the sleeve is titanium.

9. The system for repair of damaged holes in composite structures as defined in claim 1 wherein tubes are inserted in orifices in the selected array, said tubes extending beyond an outer surface of the sleeve.

10. The system for repair of damaged holes in composite structures as defined in claim 1 wherein plugs are inserted in orifices other than the selected array.

11. A method for repair of damage holes in composite structures, the method comprising:
conducting a non-destructive evaluation of a structural composite delaminated hole to assess damage;
inserting a repair system tool device sleeve having a plurality of orifices into the damaged delaminated hole;
introducing a predetermined amount of parent toughed resin into the sleeve of the repair system tool device through a central bore in the sleeve;
installing a caul plate and bagging for application of vacuum;
applying vacuum on the bag to urge the caul plate into sealing contact with a top flange maintaining substantially atmospheric pressure in the sleeve while placing a laminate around the hole under vacuum for diffusion of the resin through the orifices in the sleeve; and,
forcing the resin into the delaminations in the laminate surrounding the hole by capillary action.

12. The method as defined in claim 11 further comprising treating the sleeve of the repair system tool device with cetyle alcohol lubricant for installation.

13. The method as defined in claim 11 further comprising encircling the sleeve with an upper o-ring seal abutting the top flange.

14. The method as defined in claim 13 further comprising:
assembling a lower o-ring seal on the sleeve;
engaging a mating flange onto the sleeve; and,
tightening the mating flange to avoid leakage of resin.

15. The method as defined in claim 11 further comprising curing a damaged area under vacuum.

16. The method as defined in claim 15 further comprising:
unbagging a repaired area;
removing the caul plate; and,
withdrawing the repair system tool device sleeve from the hole.

17. The method as defined in claim 16 further comprising reaming the hole as repaired to remove excess resin and produce final tolerance hole size.

18. The method as defined in claim 17 further comprising installing a fastener into the repaired hole to continue with production.

19. The method as defined in claim 11 further comprising selecting an array of orifices to align with delaminations identified in the non-destructive evaluation.

20. The method as defined in claim 19 further comprising plugging orifices other than the selected array.

\* \* \* \* \*